United States Patent [19]
Park

[11] Patent Number: 5,841,346
[45] Date of Patent: Nov. 24, 1998

[54] PISTOL DETECTION SYSTEM

[75] Inventor: Byung Yong Park, Samik Apartment 4-306, 193-4, Seochodong, Seochoku, Seoul, Rep. of Korea

[73] Assignees: Bangsan Chemical Corporation; Byung Yong Park, both of Seoul, Rep. of Korea

[21] Appl. No.: 50,050

[22] Filed: Mar. 30, 1998

[30] Foreign Application Priority Data

Dec. 20, 1997 [KR] Rep. of Korea ....................... 97-71287

[51] Int. Cl.⁶ .................................................. G08B 21/00
[52] U.S. Cl. ...................... 340/540; 340/551; 340/572; 340/568; 324/243; 324/239; 324/260
[58] Field of Search ..................................... 340/540, 551, 340/552, 568, 572, 573, 574; 324/243, 239, 260

[56] References Cited

U.S. PATENT DOCUMENTS

| | | | |
|---|---|---|---|
| 3,884,816 | 5/1975 | Takahashi . | |
| 3,950,696 | 4/1976 | Miller et al. | 340/568 |
| 4,060,039 | 11/1977 | Lagarrigue . | |
| 4,357,535 | 11/1982 | Haas | 378/57 |
| 4,586,441 | 5/1986 | Zekich | 109/8 |
| 4,821,023 | 4/1989 | Parks | 340/551 |
| 4,866,424 | 9/1989 | Parks | 340/551 |
| 4,906,973 | 3/1990 | Karbowski et al. | 340/551 |
| 5,121,105 | 6/1992 | Aittoniemi | 340/572 |
| 5,412,708 | 5/1995 | Katz | 348/14 |
| 5,493,517 | 2/1996 | Frazier | 364/564 |
| 5,498,959 | 3/1996 | Manneschi | 324/243 |
| 5,521,583 | 5/1996 | Frahm et al. | 340/551 |
| 5,552,705 | 9/1996 | Keller | 324/239 |
| 5,552,766 | 9/1996 | Lee et al. | 340/541 |
| 5,680,103 | 10/1997 | Turner et al. | 340/551 |
| 5,689,184 | 11/1997 | Jeffers et al. | 324/243 |
| 5,726,528 | 3/1998 | Yoo | 340/551 |
| 5,747,719 | 5/1998 | Bottesch | 89/1.1 |

*Primary Examiner*—Jeffery A. Hofsass
*Assistant Examiner*—Toan N. Pham
*Attorney, Agent, or Firm*—McDermott, Will & Emery

[57] ABSTRACT

A pistol detection system including a main control unit for controlling all constituting units of the system, a magnetic force generating unit for generating a control signal for a generation of magnetic fluxes, a gate for generating magnetic fluxes of a desired intensity while receiving the generated magnetic fluxes, thereby generating an induced voltage, a magnetic force receiving unit for detecting the induced voltage, thereby determining whether or not a person who passes through the gate carries a pistol, a camera for picking up an image of the person who passes through the gate while carrying a pistol, a time generating unit for outputting time information, an image signal processing unit for composing an image signal generated from the camera with the time information generated from the time generating unit, storing the resultant signal, an automatic dialing unit for automatically dialing a previously set telephone number, and interior and exterior alarm lamps respectively for generating an alarm and emitting light in the interior and exterior of a place where the system is installed, when a pistol is detected. Thus, the pistol detection system of the present invention provides an effect of providing an effective preventative measure against the occurrence of crimes using pistols.

2 Claims, 5 Drawing Sheets

PISTOL DETECTION SYSTEM

BACKGROUND OF THE INVENTION

1. Field of the Invention

The present invention relates to a pistol detection system, and more particularly to a pistol detection system which can be easily installed at the door of a store and the like and has a function capable of picking up the image of a person who carries a pistol, upon detecting the pistol, while energizing an alarm lamp so that a person at a counter or other persons present in the store recognize the detection of the pistol, thereby acting as a preventative measure against the occurrence of crimes using pistols.

2. Description of the Prior Art

Recently, the occurrence of crimes using pistols has increased because of the free purchase and possession of weapons. However, devices for detecting such dangerous articles have been installed only at public places such as airports. No detection device for private uses has been developed. For this reason, in stores which are managed by private persons, a pistol is kept near the counter desk as a defense to cope with the occurrence of crimes. Otherwise, an emergency bell is installed near the counter desk. In such cases, however, it is impossible to recognize whether or not a person, who enters the store, carries a pistol. As a result, there is a problem in that it is impossible to effectively prevent the occurrence of crimes using pistols.

SUMMARY OF THE INVENTION

Therefore, an object of the invention is to provide a pistol detection system which can be easily installed at the door of a store and the like while surely detecting whether or not a person, who enters the store, carries a weapon, in particular, a pistol, and energizing an alarm lamp so that persons present in the store or outside the store recognize the detection of the pistol, thereby acting as a preventative measure against the occurrence of crimes using pistols.

In accordance with the present invention, this object is accomplished by providing a pistol detection system comprising: a power supply unit for supplying electric power to various constituting units of the system; a main control unit for controlling an image pickup based on a detection of a pistol while controlling all constituting units of the system based on an ON state of an emergency switch or a radio transmission signal to carry out the generation of an alarm or an automatic dialing; a magnetic force generating unit for generating a control signal for a generation of magnetic fluxes under the control of the main control unit; a gate having a portion adapted to generate magnetic fluxes of a desired intensity in response to the control signal from the magnetic force generating unit and a portion adapted to receive the generated magnetic fluxes, thereby generating an induced voltage; a magnetic force receiving unit for detecting the induced voltage generated from the gate, determining whether or not a person who passes through the gate carries a pistol, based on the detected induced voltage, and applying the result of the determination to the main control unit; a camera installed in the vicinity of the gate, the camera serving to pick up an image of the person who passes through the gate while carrying a pistol, under the control of the main control unit; a time generating unit for outputting time information; an image signal processing unit for composing an image signal generated from the camera with the time information generated from the time generating unit, storing the resultant signal, and applying the stored signal to a monitor or video recorder when a replay function is selected; an automatic dialing unit for automatically dialing a previously set telephone number under the control of the main control unit; an alarm driving unit for controlling external alarm units under the control of the main control unit; a searchlight for emitting light to the gate under the control of the alarm driving unit when the camera carries out an image pickup operation thereof; an interior alarm lamp for generating an alarm and emitting light in the interior of a place where the system is installed, when a pistol is detected, under the control of the alarm driving unit; an exterior alarm lamp for generating an alarm and emitting light in the exterior of the place where the system is installed, when a pistol is detected, under the control of the alarm driving unit; a key input unit for selecting and adjusting functions of various units of the system including a volume adjustment and ON/OFF control for the interior and exterior alarm lamps, next-dialing ON/OFF control, telephone setting, and receiving magnetic force sensitivity control; a radio transmitter for selecting desired functions of the system in a radio manner; and a radio receiver for receiving a transmission signal from the radio transmitter indicative of a selected function, and sending the transmission signal to the main control unit.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
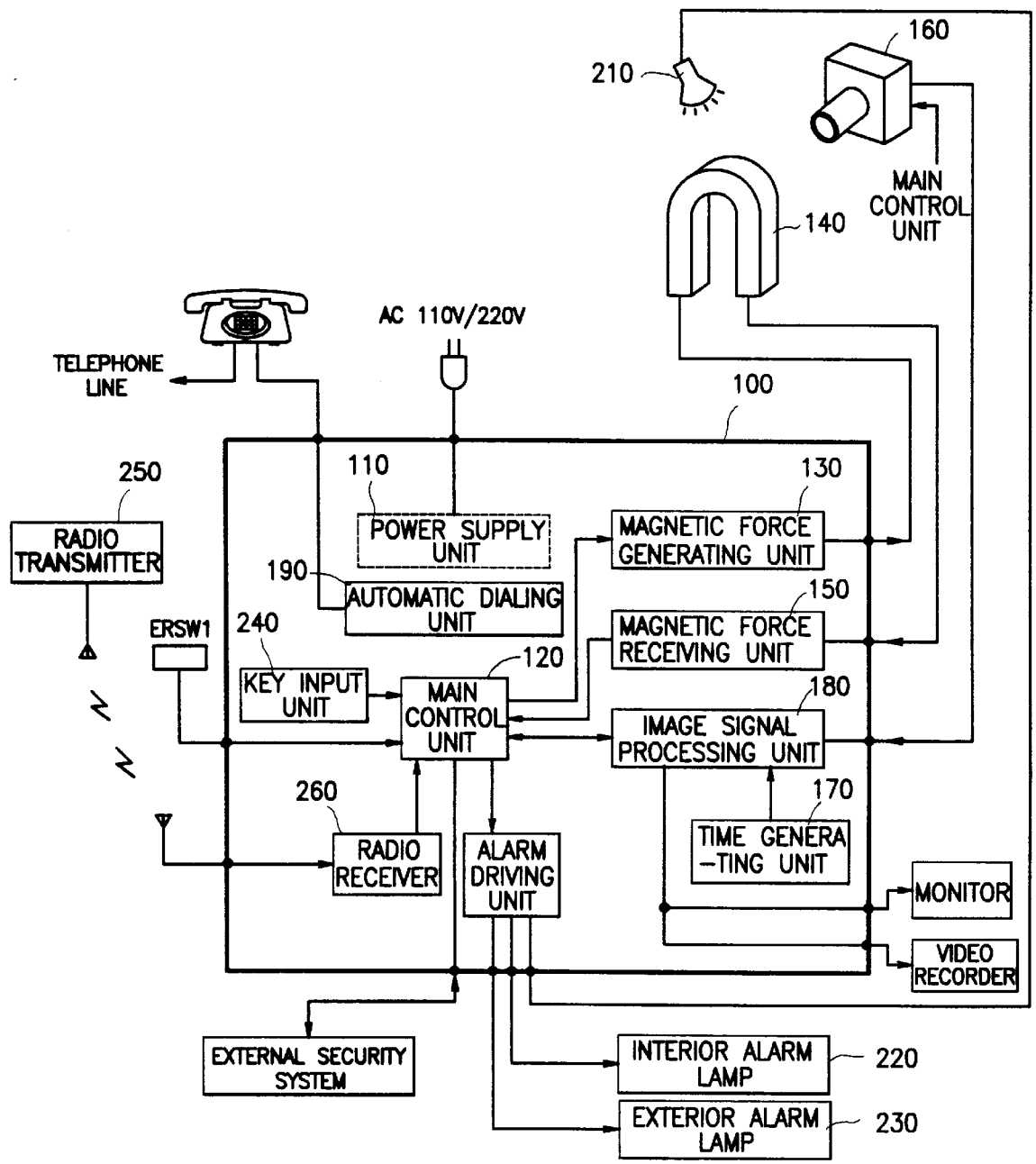
FIG. 1 is a block diagram illustrating a pistol detection system according to the present invention.

Referring to FIG. 1, a pistol detection system according to the present invention is illustrated. As shown in FIG. 1, the pistol detection system includes a system body 100 in which a variety of operating units constituting the pistol detection system are disposed. The pistol detection system also includes a power supply unit 110 disposed in the system body 100 and adapted to supply electric power to various constituting units of the system. In Korea, AC 220V is used as a rated voltage. In some nations, for example, U.S.A., AC 117V is used as a rated voltage. Taking into consideration the use of such different rated voltages, the power supply unit 110 is designed to have a free voltage system capable of processing input voltage ranging from AC 100V to AC 240V.

Where it is impossible to use the free voltage system due to unavoidable circumstances, the power supply unit 110 is designed to have a dual voltage system capable of selectively processing voltages of 110V and 220V. In this case, an SMPS system is used for a power supply circuit system, if possible.

The pistol detection system of the present invention also includes a main control unit 120 adapted to perform a control operation for the detection of a pistol when the constituting units of the system are energized. The control operation of the main control unit 120 will be described in detail in conjunction with FIG. 2.

Figure 2:
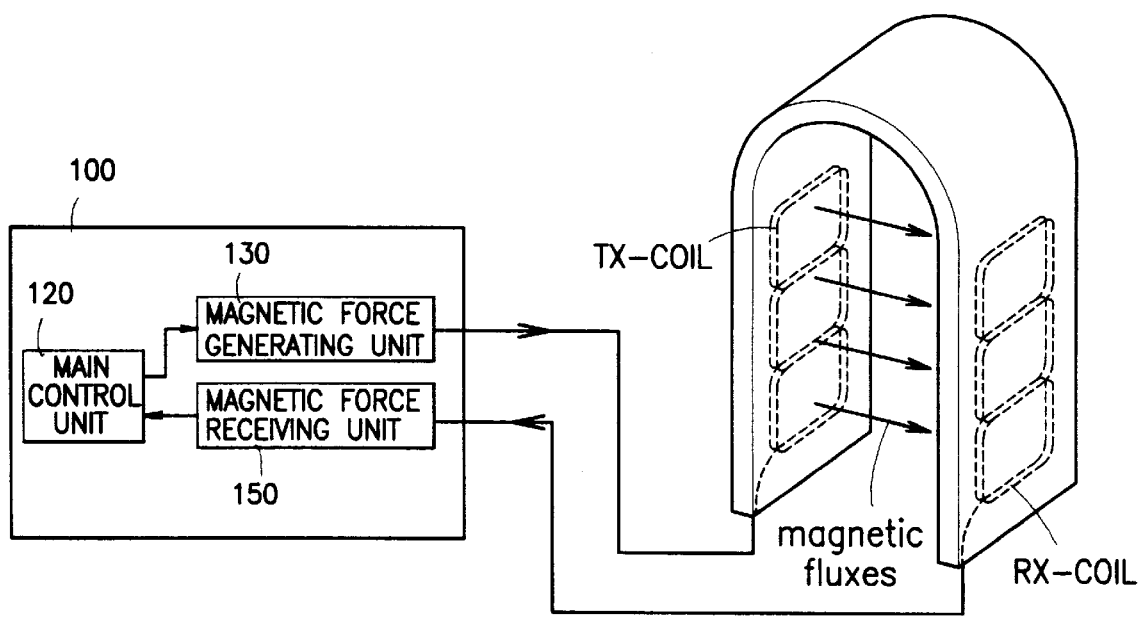
FIG. 2 is a diagram illustrating a detailed configuration of a gate included in the pistol detection system of FIG. 1.

For the detection of pistols, magnetic fluxes are generally used. That is, a variation in magnetic fluxes is sensed to detect whether or not there is a pistol. This principle is utilized in the pistol detection system of the present invention. As shown in FIG. 2, the pistol detection system of the present invention includes a gate 140 provided, at one side portion thereof, transmitting coils TX-coil adapted to generate magnetic fluxes and, at the other side portion thereof, receiving coils RX-coil adapted to generate an induced voltage proportional to the magnetic fluxes generated from the transmitting coils TX-coil. The pistol detection system further includes a magnetic force generating unit 130 for generating a control signal for the generation of magnetic force under the control of the main control unit 120 and applying the control signal to the gate 140. When the gate 140 receives the control signal from the magnetic force generating unit 130, its transmitting coils TX-coil generate magnetic fluxes of a certain intensity.

When the receiving coils RX-coil receive the magnetic fluxes generated from the transmitting coils TX-coil, they generate an induced voltage proportional to the intensity of the received magnetic fluxes. This induced voltage is compared with a reference voltage by a magnetic force receiving unit 150 which is included in the pistol detection system. The magnetic force receiving unit 150 sends a signal indicative of the result of the comparison to the main control unit 120.

Figure 3:
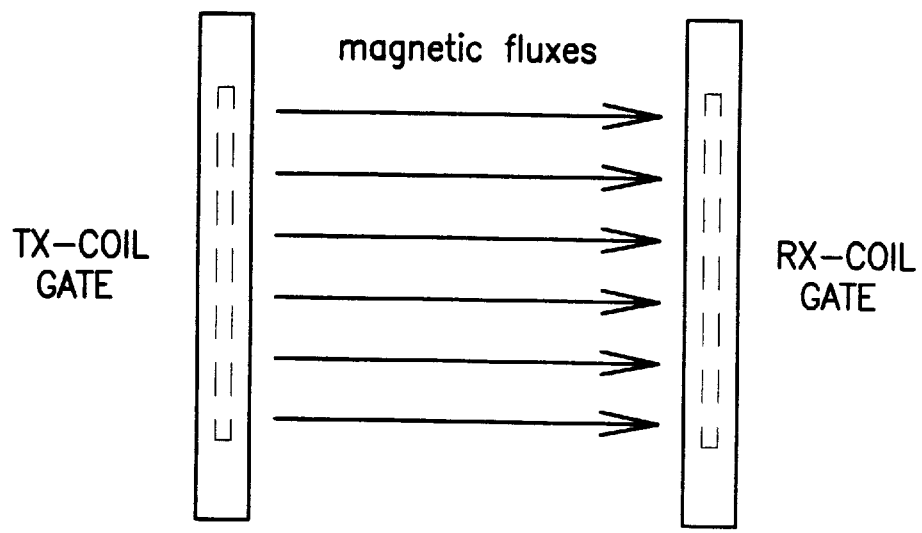
FIG. 3 is a schematic view illustrating the generation of magnetic fluxes from the gate of FIG. 2 in a normal state.
Figure 4:
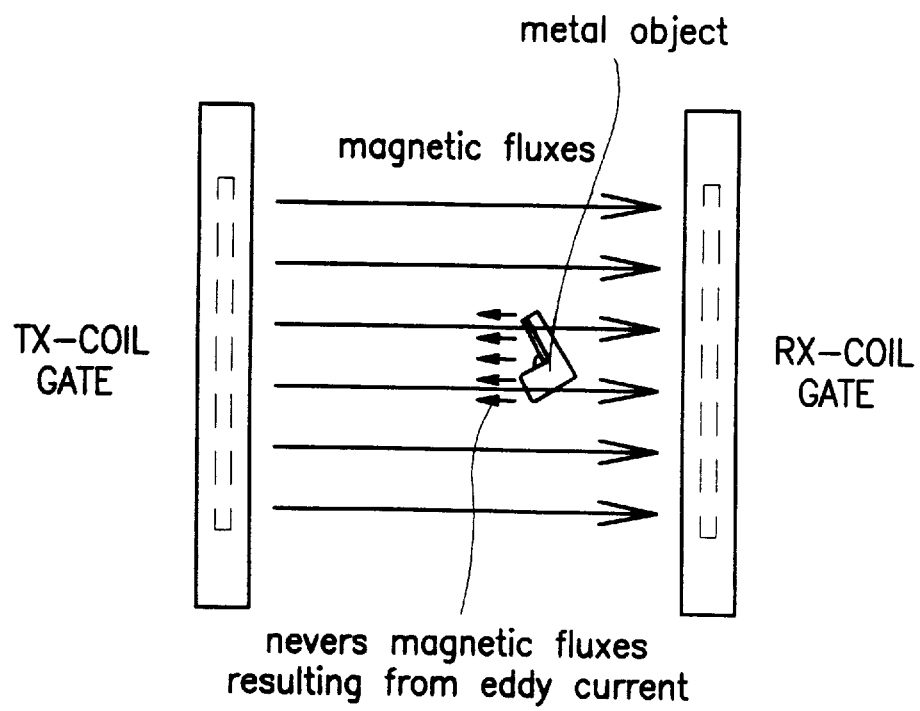
FIG. 4 is a schematic view illustrating the generation of magnetic fluxes from the gate of FIG. 2 in a pistol detection state.

A maximum induced voltage is generated in a normal state, that is, when there is no object between the transmitting and receiving coils TX-coil and RX-coil, as shown in FIG. 3. However, when a metal object having a certain size passes through the gate 140, eddy current is generated at the surface of the metal object. This eddy current serves to generate magnetic fluxes reverse to the magnetic fluxes generated from the transmitting coils TX-coil. As a result, the intensity of the magnetic fluxes applied to the receiving coils RX-coil is reduced, so that the induced voltage generated from the receiving coils RX-coil is correspondingly reduced. Thus, the metal object is detected by detecting a variation in the induced voltage generated from the receiving coil RX-coil.

Figure 5:
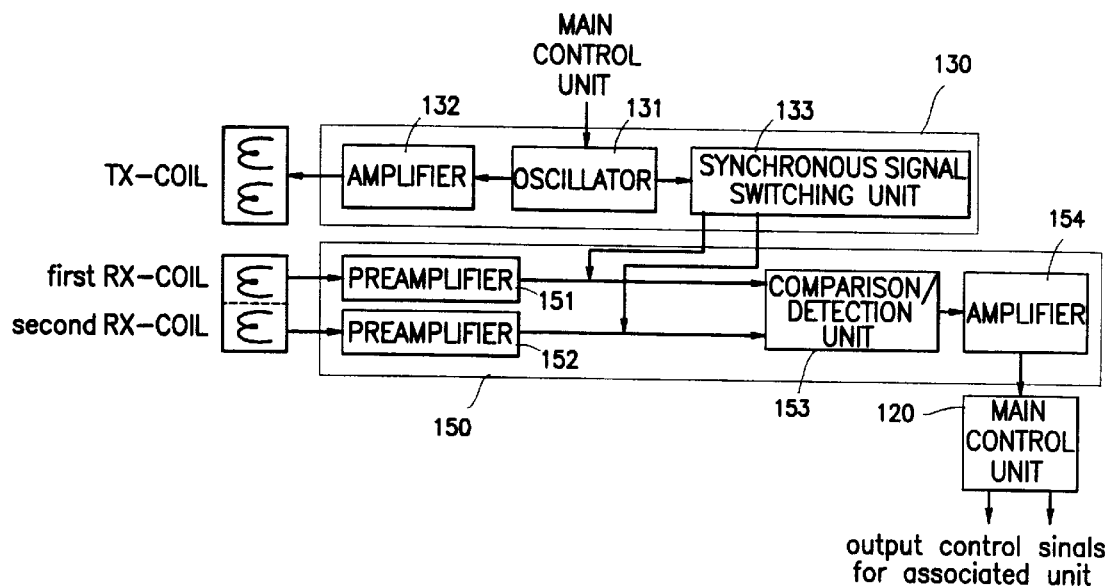
FIG. 5 is a block diagram illustrating a detailed configuration of magnetic force generating and receiving units included in the pistol detection system of FIG. 1.

The detection operation will be described in more detail in conjunction with FIG. 5 which is a block diagram illustrating a detailed configuration of the magnetic force generating unit 130 and magnetic force receiving unit 150.

When the main control unit 120 applies a magnetic force generation control signal to the magnetic force generating unit 130, an oscillator 131 included in the magnetic force generating unit 130 generates a signal having a desired waveform. The signal from the oscillator 131 is then applied to an amplifier 132 and a synchronous signal switching unit 133. The amplifier 132 amplifies the received signal to a level capable of sufficiently exciting the transmitting coils TX-coil and then sends the amplified signal to the transmitting coils TX-coil. As a result, the transmitting coils TX-coil generate magnetic fluxes of a desired intensity.

When the receiving coils RX-coil receive the magnetic fluxes from the transmitting coils TX-coil, they generate an induced voltage which is, in turn, applied to a pair of preamplifiers 151 and 152 respectively coupled to a pair of receiving coils included in the receiving coils RX-coil. Each of the preamplifiers 151 and 152 serves to amplify the received voltage to a desired level and outputs the amplified signal in sync with a switching signal output from the synchronous signal switching unit 133.

The output signal from each preamplifier is then applied to a comparison/detection unit 153 which, in turn, compares the applied signal with a predetermined reference voltage. When a variation in the intensity of magnetic fluxes not less than a certain level is detected as the result of the comparison, the comparison/detection unit 153 generates a metal detection signal. When the comparison/detection unit 153 generates an output signal indicative of the result of its comparison operation, the output signal is applied to an amplifier 154 which, in turn, amplifies the applied signal. The amplified signal is then applied to the main control unit 120.

Meanwhile, it is possible to adjust a deviation in the sensitivity of the magnetic force receiving unit caused by a deviation in the sensitivity of the receiving coils, using a key input unit 240 which is also included in the pistol detection system. This adjustment may be carried out after the installation of the pistol detection system in order to compensate for a sensitivity deviation generated among different places where the pistol detection system is installed.

In accordance with the present invention, the standard of metal objects to be detected is based on the Standard stipulated by the U.S. FBI. In other words, the "standard pistol" stipulated by the U.S. FBI Standard is set as a minimum object to be detected. Accordingly, the pistol detection system of the present invention can detect any metal object, including pistols, knives and the like, having a mass not less than the mass of the standard pistol.

When a pistol object is detected in accordance with the above mentioned pistol detection operation, the main control unit 120 controls a camera 160 to operate, prior to its control for operating an alarm unit. That is, the camera 160 picks up the image of a person who passes through the gate 140 while carrying a pistol. At this time, a searchlight 210, which is installed near the gate 140, may be turned on, so as to attempt a more clear image pickup.

An image signal from the camera 160 is applied to an image signal processing unit 180 which is disposed in the system body 100. The image signal processing unit 180 composes the applied image signal with temporal data generated from a time generating unit 170, thereby generating a composite video signal of the NTSC system. The composite video signal from the image signal processing unit 180 is then applied to a video recorder which is an external monitor or recorder.

The image signal from the camera 160 input at the image signal processing unit 180 is stored in a video RAM (flash memory having a capacity of 2M) by using a digital conversion method used in a PIP system. The storage of the image signal is carried out in such a manner that 4 frames are successively stored at intervals of 0.5 second in response to a control signal from the main control unit 120.

Figure 6:
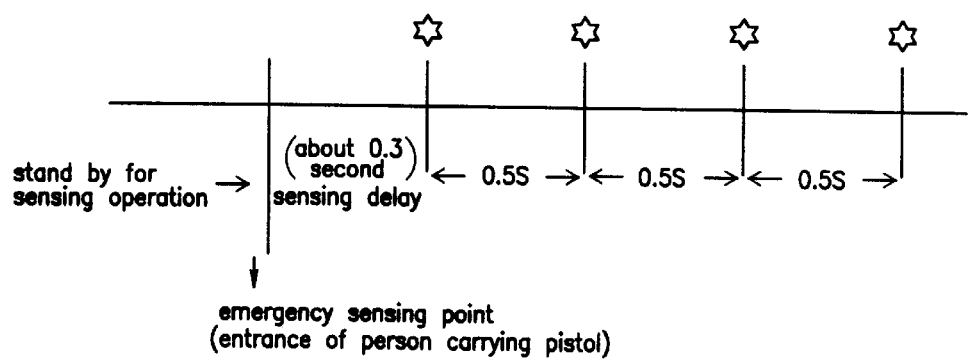
FIG. 6 is a diagram illustrating a temporal operation of a camera included in the pistol detection system of FIG. 1.

This temporal image storing operation is illustrated in FIG. 6. As shown in FIG. 6, four frames of the image data about the detected person are successively obtained and stored along with temporal data, respectively.

Basically, the video RAM adapted to store image signals have four flash memories each capable of storing 50 frames. Accordingly, it is possible to store a maximum of 200 frames. When a new frame is to be stored after 200 frames are completely stored, the first stored frame is erased to overwrite the new frame. An extension of the basic memory can be accomplished by providing additional flash memories.

When the emergency switch ERSW1 turns on in response to the occurrence of a crime, the video RAM does not receive a subsequent image signal until the emergency state is released, in order to maintain the currently stored image signal.

The video RAM has a minimum horizontal resolution of 200 lines. In addition, the system body 100 uses a backup power in order to maintain data when a power failure is kept for at least 72 hours.

The stored image signal is displayed in accordance with a replay function selected by the user. The replay of image signals is begun from the most recent one of the stored image signals. The replay of the remaining image signals is then selected using an up/down button of the key input unit 240. The operation mode of the pistol detection system can return to a normal mode for an image pickup by selecting again the replay function.

Figure 7:
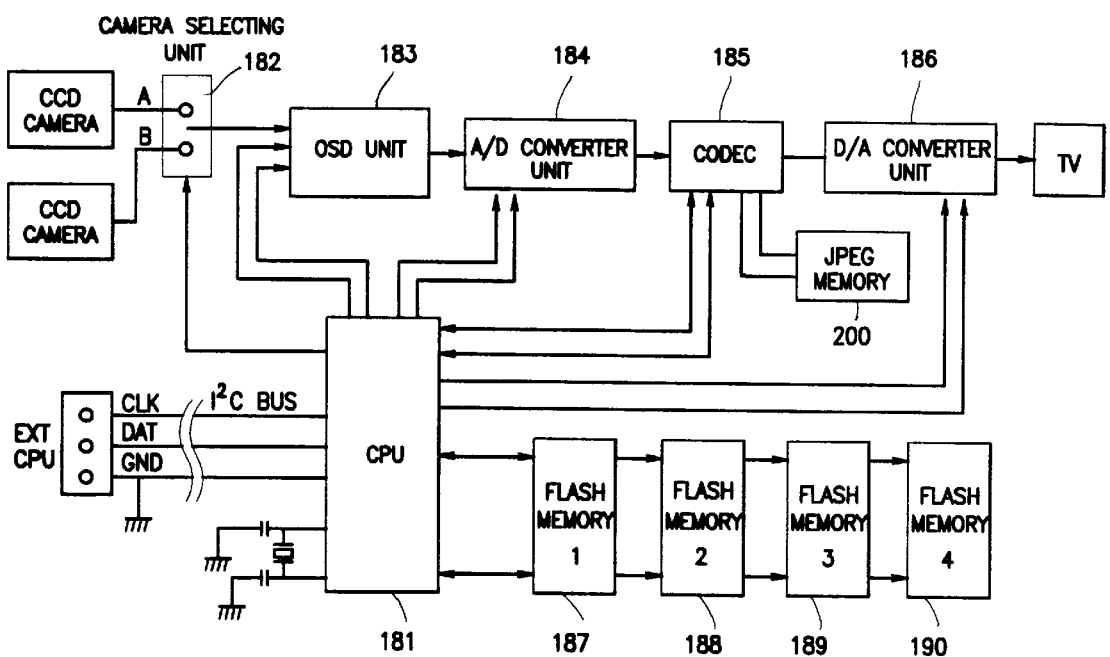
FIG. 7 is a block diagram illustrating a detailed configuration of an image signal processing unit included in the pistol detection system of FIG. 1.

Now, a general operation of the image signal processing unit 180 will be described in conjunction with FIG. 7 which illustrates a detailed configuration of the image signal processing unit.

A central processing unit (CPU) 181, which serves to control the entire configuration of the image signal processing unit 180, first controls a camera selecting unit 182 serving to select a desire one of several cameras. This camera selecting unit 182 may be omitted when a single camera 160 is used. The CPU 181 also controls an OSD unit 183 to compose an image signal generated from the selected camera 160 with a temporal character signal generated from the time generating unit 170.

A composite signal generated from the OSD unit 183 is then applied to an analog/digital converter unit 184 which, in turn, converts the received image signal having an analog form into an YUV color signal having a digital form. The YUV color signal from the analog/digital converter unit 184 is sent to a coder/decoder (CODEC) 185 which, in turn, compresses the received digital signal at a rate of 1/20. The compressed data is temporarily stored in a JPEG memory 200. The compressed image signal from the CODEC 185 is then sent to the CPU 181 which, in turn, stores the received image signal in the flash memories 187 to 190. The image signal stored in the flash memories 187 to 190 is transmitted again to the CODEC 185 when the replay function is selected. In this case, the image signal is extended in the CODEC 185 which, in turn, sends the extended image signal to a digital/analog converter unit 186, thereby converting the image signal into an analog form. Thus, the image signal is displayed on a monitor or television.

After a desired period of time (about one second) elapses from the beginning of the image pickup, the main control unit 120 controls an interior alarm lamp 220 to turn on, thereby generating an alarm and emitting light.

The reason why the alarm units operate after a desired period of time (about one second) elapses from the beginning of the image pickup is to pick up an image of the front appearance of the detected person. The reason why the interior alarm lamp 220 turns on is not only to inform the person who carries a pistol of the detection of the pistol, but also to inform other persons, who are present in the store, of the fact that the person who currently enters the store carries a pistol, and to produce an opportunity for a partner of the detected person, who is possibly present in the store, to give up their criminal plan.

When a crime occurs, an exterior alarm lamp 230 may turn on under the control of the emergency switch ERSW1, key input unit 240 and a radio transmitter 250. The reason why the exterior alarm lamp 230 turns on is not only to produce an opportunity for a partner of the detected person, who is possibly present in the store, to give up their criminal plan, but also to inform other persons, who are present in the store, of the fact that the person who currently enters the store carries a pistol.

Preferably, the interior alarm lamp 220 is installed at the counter desk whereas the exterior alarm lamp 230 is installed at the entrance of the store. In particular, the exterior alarm lamp 230 is installed together with a signboard written with a message "Pistol Detection System is in Operation in Our Store". Preferably, the emergency switch ERSW1 is positioned at a place enabling easy access by a person at the counter thereto.

Also, the main control unit 120 outputs a control signal for an automatic dialing when the emergency switch ERSW1 is switched on or when there is a control signal generated from the key input unit 240 or radio transmitter 250. The control signal from the main control unit 120 is applied to an automatic dialing unit 190 which, in turn, automatically dials the telephone number of a police station or security company priviously set. Thus, it is possible to reduce the time taken for the moving in of the police when a crime occurs.

In this case, a waiting-calling function may be set in order to enable a dialing for a central office switching or calling.

Example 1) 9+(Waiting about 3 or 4 seconds)+a designated telephone number

Example 2) a designated number+(Waiting about 3 or 4 seconds)+a designated telephone number In order to ensure a call connection, a "recall attempt function" is surely performed. A "next-dialing" function for sequentially dialing input telephone numbers may also be carried out.

The ON/OFF setting of The all automatic dialing functions and the operations of the interior and exterior alarm lamps 220 and 230 may be achieved using the key input unit 240.

The pistol detection system also includes a radio transmitter 250 which is adapted to be used by a person who is present in the store or at the counter, in order to carry out transmissions with the system body 100. This configuration is necessary for the case in which no appropriate defense to cope with the occurrence of crimes is carried out near the counter. When a worker or other person present in the store selects an alarm generating function or automatic dialing function using the radio transmitter 250, a control signal generated from the radio transmitter 250 is applied to the main control unit via a radio receiver 260.

In this case, an ROD antenna is used in order to obtain a stable reception sensitivity. In addition, an FM radio modulation communication system (of a band of about 303 Mhz), which is normally used for private purposes, for example, in high-class vehicle alarm units, is used in order to provide a compatibility among design elements.

In order to prevent a communication cross while obtain a security, an access code is used which is selected from $3^{10}$(=59,049) codes.

The key input unit 240 is mounted on the system body 100. The key input unit 240 includes a display unit having 7 segments to display all button switches and selected functions. The selected functions may include the above mentioned video replay, alarm volume control, ON/OFF control, next dialing ON/OFF control, receiving magnetic force sensitivity adjustment, telephone number setting, and time setting.

The pistol detection system may be coupled to an external safety system which is provided by an expert security company. In this case, a call or alarm signal from the pistol detection system is sent to the expert security company via the external safety system.

As apparent from the above description, the present invention provides a pistol detection system capable of detecting a pistol using magnetic fluxes, picking up an image of the appearance of a person who carries the detected pistol, while generating an alarm. The pistol detection system also has a function for automatically calling a police station. Thus, the pistol detection system of the present invention provides an effect of providing a preventative measure against the occurrence of crimes using pistols.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A pistol detection system comprising:

a power supply unit for supplying electric power to various constituting units of the system;

a main control unit for controlling an image pickup based on a detection of a pistol while controlling all constituting units of the system based on an ON state of an emergency switch or a radio transmission signal to carry out the generation of an alarm or an automatic dialing;

a magnetic force generating unit for generating a control signal for a generation of magnetic fluxes under the control of the main control unit;

a gate having a portion adapted to generate magnetic fluxes of a desired intensity in response to the control signal from the magnetic force generating unit and a portion adapted to receive the generated magnetic fluxes, thereby generating an induced voltage;

a magnetic force receiving unit for detecting the induced voltage generated from the gate, determining whether or not a person who passes through the gate carries a pistol, based on the detected induced voltage, and applying the result of the determination to the main control unit;

a camera installed in the vicinity of the gate, the camera serving to pick up an image of the person who passes through the gate while carrying a pistol, under the control of the main control unit;

a time generating unit for outputting time information;

an image signal processing unit for composing an image signal generated from the camera with the time information generated from the time generating unit, storing the resultant signal, and applying the stored signal to a monitor or video recorder when a replay function is selected;

an automatic dialing unit for automatically dialing a previously set telephone number under the control of the main control unit;

an alarm driving unit for controlling external alarm units under the control of the main control unit;

a searchlight for emitting light to the gate under the control of the alarm driving unit when the camera carries out an image pickup operation thereof;

an interior alarm lamp for generating an alarm and emitting light in the interior of a place where the system is installed, when a pistol is detected, under the control of the alarm driving unit;

an exterior alarm lamp for generating an alarm and emitting light in the exterior of the place where the system is installed, when a pistol is detected, under the control of the alarm driving unit;

a key input unit for selecting and adjusting functions of various units of the system including a volume adjustment and ON/OFF control for the interior and exterior alarm lamps, next-dialing ON/OFF control, telephone setting, and receiving magnetic force sensitivity control;

a radio transmitter for selecting desired functions of the system in a radio manner; and a radio receiver for receivng a transmission signal from the radio transmitter indicative of a selected function, and sending the transmission signal to the main control unit.

2. The pistol detection system in accordance with claim 1, wherein the main control unit sets a metal object having a mass and volume corresponding to those of a previously set standard pistol, as a minimum object to be detected.

* * * * *